July 12, 1960
D. W. CLAUSSEN
2,945,181
MEASURING APPARATUS
Filed March 25, 1957
2 Sheets-Sheet 1
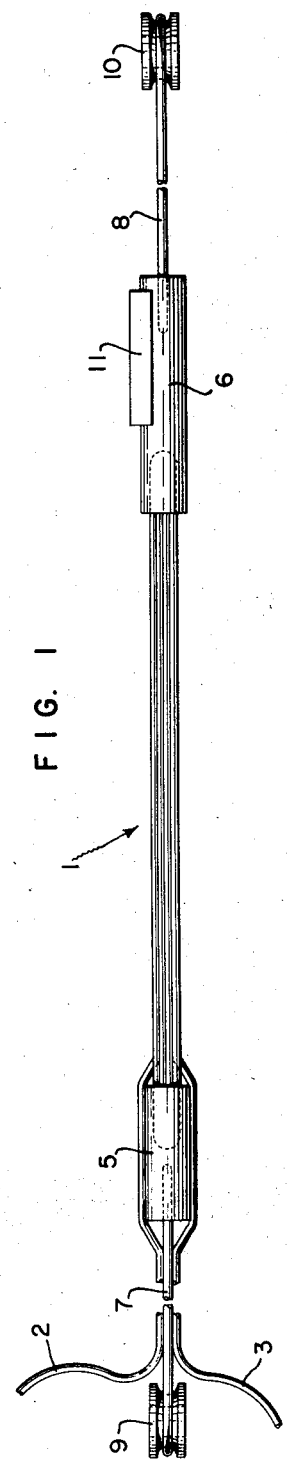
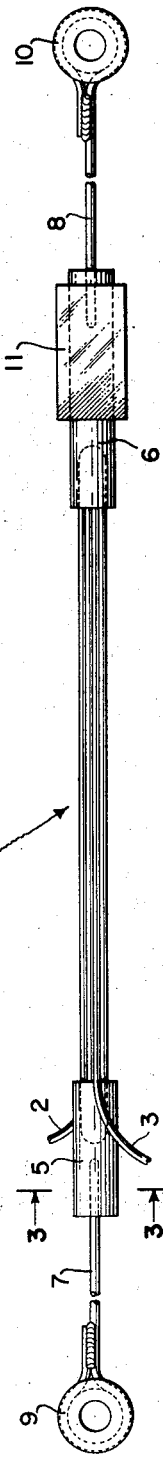
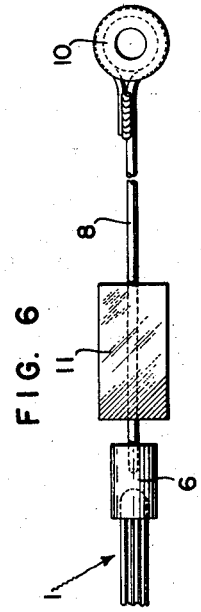
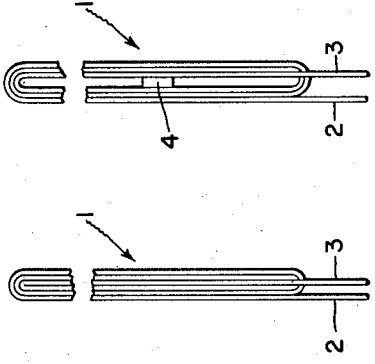
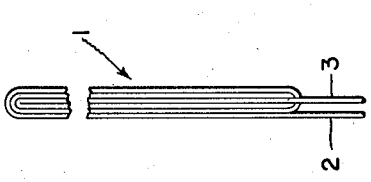
INVENTOR.
DELMAR W. CLAUSSEN
BY Arthur H. Swanson
ATTORNEY.

July 12, 1960

D. W. CLAUSSEN 2,945,181

MEASURING APPARATUS

Filed March 25, 1957

INVENTOR.
DELMAR W. CLAUSSEN

BY Arthur H. Swanson

ATTORNEY.

United States Patent Office 2,945,181
Patented July 12, 1960

2,945,181

MEASURING APPARATUS

Delmar W. Claussen, Denver, Colo., assignor to Minneapolis-Honeywell Regulator Company, Minneapolis, Minn., a corporation of Delaware Filed Mar. 25, 1957, Ser. No. 648,160

2 Claims. (Cl. 324—154)

A general object of the present invention is to improve the construction, reliability and frequency range of operation of galvanometers of the type having a movable coil. The invention is of particular utility in extending the permissible frequency range of recording, oscillographic galvanometers to frequencies up to 20,000 cycles per second. Such frequencies are considerably higher than any heretofore achieved by galvanometers employing moving coils.

It is a specific object of this invention to provide a galvanometer including a moving coil having low inertia, this galvanometer possessing a natural frequency several times greater than that heretofore obtainable while still retaining a satisfactory sensitivity.

More specifically, it is an object of this invention to provide a galvanometer including a coil having no inner radius or at most a very small one.

A further object of this invention is to provide a galvanometer coil which is self supporting and which depends on the strength of the wire of which it is made and of cement applied to this wire to hold its desired shape.

Yet a further object of this invention is to provide members for suspending the coil of a galvanometer which suspending members have a transverse cross sectional area equal to or greater than the transverse cross sectional area of the coil.

Galvanometers employing a moving coil, as known prior to this invention, had means for supporting the coil for movement comprising: a pair of supporting members, such as filaments of quartz, each attached at one end to a stationary part of the galvanometer and attached at the other end to a bobbin or coil-supporting member on which the coil was wound. This construction required that horizontal distance between the vertical axis (about which the coil oscillated) and the outer portion of the coil be greater than the horizontal distance between the same vertical axis and the outer portion of each supporting member. In such prior constructions the inertia of the coil per se accordingly was relatively high. This high inertia served to limit the natural frequency attained by the galvanometer although a satisfactory current-sensitivity was retained.

By providing a coil lying in its entirety as close as possible to the axis of oscillation, this invention avoids the defects of galvanometers as heretofore known. With this improved construction the effects of inertia are minimized permitting higher natural frequencies of oscillation while still retaining a desired and satisfactory sensitivity of response.

A better understanding of the present invention may be had from the following detailed description when read in connection with the accompanying drawings, in which:

Fig. 1 shows the side of a complete suspension assembly;

Fig. 2 shows the front of the complete suspension assembly;

Fig. 3 shows a transverse, cross section on line 3—3 of Fig. 2 as viewed in the direction of the arrows;

Fig. 4 is a side view on an enlarged scale showing a portion of the coil;

Fig. 5 is a side view on the same scale as Fig. 4 showing a portion of a modified form of coil;

Fig. 6 is a front view of a portion of a modified form of the suspending assembly;

Figure 7:
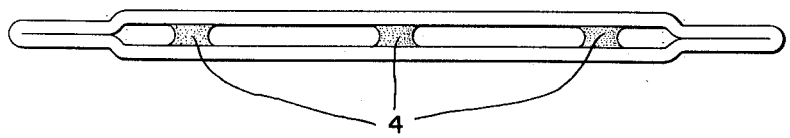
Fig. 7 is a side elevation on an enlarged scale showing another modified form of coil.

In that embodiment of my invention selected from among others for illustration in the drawings and description in the specification, coil 1 comprises a number of turns of fine wire. The longitudinal cross section of this coil may be circular or flat, but the feature is that the turns of the coil have at their ends an inner radius as small as possible. Because the coil has as small a transverse cross section as possible, it has a low inertia but a natural frequency several times greater than that heretofore attainable and has a satisfactory sensitivity.

The maximum benefits of this invention are attained when the transverse cross section of the coil 1 is a minimum, i.e., when the turns of the wire at the ends of the coil have an inner radius as small as possible. Fig. 4 shows such a coil.

Coil 1 comprises a number of turns of fine wire. Each turn has two, straight, relatively long, side portions which extend parallel to the axis of oscillation. Each turn also has two, semi-circular, relatively short, end portions which extend in an arc having its center of radius lying in or closely adjacent to the axis of oscillation. The side portions and the end portions of each turn are in engagement with the adjacent turns.

Coil 1 thus approximates an elongated solid structure having no voids within the body thereof because each turn engages with the turns adjacent to it.

However, it is possible to secure the improved results due to this invention by employing a coil having an inner radius greater than zero. Fig. 5 shows such a construction comprising a modified form of coil having an inner radius greater than zero. This is attained by placing one or more bridges 4 of insulating material between the inner turns of the wires constituting the coil. One or more bridges 4 are formed by being cut from a suitable piece of insulating material and cemented in place. Alternatively, the bridges 4 may be formed of fillets of cement. In either case, the cement is hardened by being thoroughly cured by baking. In most cases, the bridges formed of fillets of cement are the more suitable. One or more bridges 4 serve simply as spacers. Bridges 4 are not part of the means by which the coil 1 is suspended.

Fig. 7 shows a second modified form of coil 1 in which the ends of the coil are compressed after the coil has been removed from the winding fixture, as hereinafter explained. The central portion of coil 1 is separated by a plurality of bridges 4.

The ends of the wire constituting the coil 1 are shown at 2 and 3. These ends provide the leads for the electricity to the coil. Leads 2 and 3 are separated from the remainder of the coil and may be connected to one of the suspending members and extend towards one end of the supporting assembly.

Each of the ends of the coil 1 is inserted into a ferrule 5 or 6 separate from that into which the other end is inserted. Ferrules 5 and 6 each comprise a connecting or supporting sleeve which may be made of metal or plastic. The transverse cross sectional area of the ferrules 5 and 6 may be equal to or greater than the transverse cross sectional area of the coil 1. The ends of coil 1 are inserted into the ends of the ferrules 5 and 6 which are nearest to the opposite end of ferrule 6 or 5, respectively. These ends are cemented in place.

Suspending members 7 and 8 are made of any suitable material and are either round or flat in transverse cross section. One of the ends of each suspending members 7 and 8 is slipped into one of the ends of one of the ferrules 5 and 6 which is farthest from the opposite end of ferrule 6 or 5 respectively. These ends are soldered or cemented in place.

The opposite end of each of the suspending members 7 and 8 is passed around the outer surface of bobbin 9 or 10. Bobbins 9 and 10 are of insulating material and each has a perforation through the center thereof. The end of the suspending member 7 or 8 is soldered to the adjacent portion thereof. This joint may be bound by fine wire (not shown) for added strength, if desired. A mirror 11 is mounted on the upper ferrule 6 and held firmly in place there by suitable cement.

Fig. 6 shows a modified form of mounting in which the mirror 11 is carried on the suspending member 8.

Figure 8:
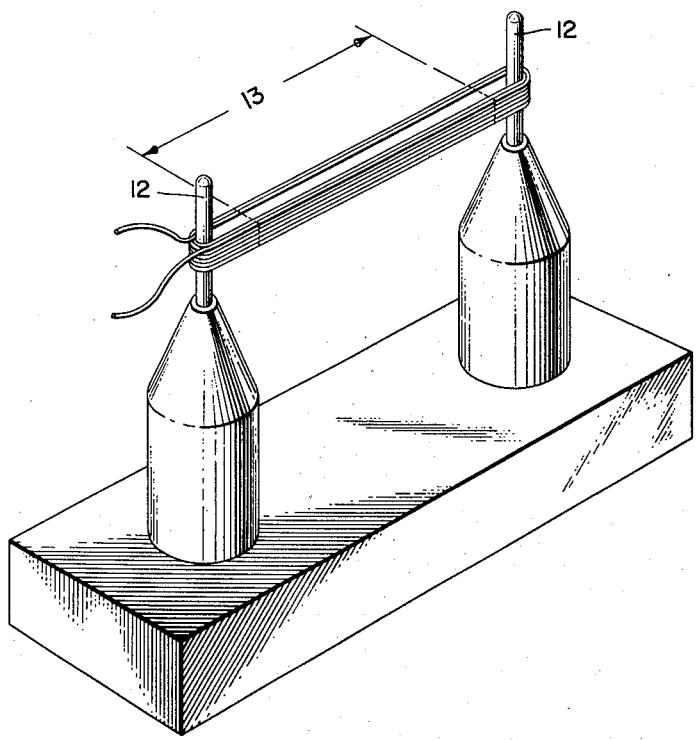
Fig. 8 is a perspective view showing a novel method of winding the galvanometer coil of this invention.

Fig. 8 shows the coil 1 as it is wound on a winding fixture. The winding pins 12 are the members on which the coil is supported during the winding process. The size of these pins may vary with individual applications, but is about 0.006 of an inch to 0.010 of an inch in diameter.

After the desired number of turns of wire have been wound on the pins 12 to form the coil 1, each side of the coil is given a coat of cement in the area enclosed by dimension 13, Fig. 8. Care must be taken to avoid cement getting into the area of the winding pins, as this would make it very difficult to remove the coil from the winding pins at a later stage in the process. This layer of cement is then thoroughly cured by baking.

If the sides of the coil are to be kept separated, bridges 4 are inserted at this time. These bridges 4 may be cut from an insulating material or formed by a fillet of cement. In most cases the cement bridge is the more suitable. After this cement has been cured, the coil is removed from the winding pins and ready to use in the suspension.

The coil may be compressed to the shape shown in Fig. 4 after being removed from the winding pins 12, and then coated with cement and cured by thoroughly baking. This, in effect, produces a coil having an inner or winding radius of zero.

What is claimed is:

1. In an oscillatory-type galvanometer having low inertia, high natural frequency, and statisfactory sensitivity: an elongated coil of fine wire having straight side portions and arcuate end portions and mounted for movement about an axis of oscillation and comprising a single cylindrical central portion having a disc-shaped cross section transversely of its longest axis and of said axis of oscillation and having straight side portions and comprising two hemi-spherical end portions, said coil having no voids in it and being made up of a single fine wire having a number of straight portions laid side-by-side and connected at their ends by arcuate end portions laid side-by-side, a pair of cylindrical ferrules which are larger in transverse cross-section than the coil and each having a disc-shaped cross section transversely of its longest axis and of said axis of oscillation and having straight side portions and a flat end portion with a hemi-spherical recess therein and receiving one end of said coil, in said hemi-spherical recess and covering said end of said coil, cement securing said recesses and said ends of said coil together, a pair of suspending members each secured to one end of the associated one of the ferrules, which end is opposite to the end of said ferrules attached to said coil, leads constituting the ends of said coil and accessible for connecting into an electric circuit, and a mirror connected to said suspension system between the ends thereof.

2. In an oscillatory-type galvanometer having low inertia, high natural frequency, and satisfactory sensitivity: an elongated coil of fine wire having straight side portions and arcuate end portions and mounted for movement about an axis of oscillation and comprising a single cylindrical central portion having a disc-shaped cross section transversely of its longest axis and of said axis of oscillation and having straight side portions and comprising two hemi-spherical end portions, said coil being made up of a single fine wire having a number of straight portions laid side-by-side and connected at their ends by arcuate end portions laid side-by-side and having a bridge of insulating material interposed between and separating portions of said coil on opposite sides of said axis of oscillation and spaced from the ends of said coil, a pair of cylindrical ferrules which are larger in transverse cross section than the coil and each having a disc-shaped cross section transversely of its longest axis and of said axis of oscillation and having straight side portions and a flat end portion with a hemi-spherical recess therein and receiving one end of said coil in said hemi-spherical recess and covering said end of said coil, cement securing said recesses and said ends of said coil together, a pair of suspending members each secured to one end of the associated one of the ferrules, which end is opposite to the end of said ferrules attached to said coil, leads constituting the ends of said coil and accessible for connection into an electric circuit, and a mirror connected to said suspension system between said bobbins.

References Cited in the file of this patent

UNITED STATES PATENTS

| 985,420 | Keller | Feb. 28, 1911 |
| 2,237,552 | Ellis | Apr. 8, 1941 |
| 2,425,408 | Williams | Aug. 12, 1947 |
| 2,510,585 | Kellogg | June 6, 1950 |
| 2,599,661 | Richardson | June 10, 1952 |
| 2,622,118 | Hendricks | Dec. 16, 1952 |
| 2,678,424 | Heiland | May 11, 1954 |

FOREIGN PATENTS

| 4,276 | Great Britain | Mar. 6, 1892 |